United States Patent [19]

Haapala

[11] Patent Number: 4,502,241
[45] Date of Patent: Mar. 5, 1985

[54] FISHING REEL WITH ADJUSTABLE LET-OFF LIMIT

[76] Inventor: Ray Haapala, Rte. 3, Box 76, Dassel, Minn.

[21] Appl. No.: 532,141

[22] Filed: Sep. 14, 1983

[51] Int. Cl.³ .............................................. A01K 89/00
[52] U.S. Cl. .................................... 43/20; 242/84.1 L
[58] Field of Search ......... 43/20; 242/84.1 L, 84.5 R, 242/99

[56] References Cited

U.S. PATENT DOCUMENTS

| | | | |
|---|---|---|---|
| 2,659,573 | 11/1953 | Smith, Sr. | 242/99 |
| 3,041,044 | 6/1962 | Nixon | 242/99 |
| 3,530,611 | 9/1970 | Britt | 43/20 |
| 3,777,591 | 12/1973 | Thomasian | 242/84.1 L |
| 4,191,340 | 3/1980 | Kubanek | 242/84.1 L |

Primary Examiner—Nicholas P. Godici
Assistant Examiner—Kurt Rowan
Attorney, Agent, or Firm—Littlepage & Webner

[57] ABSTRACT

A fishing reel has a one-way break which can be pre-set to stop let-off of the line after a pre-determined number of turns of the reel.

4 Claims, 5 Drawing Figures

FISHING REEL WITH ADJUSTABLE LET-OFF LIMIT

FIELD OF THE INVENTION

Winding and reeling fishing rod type, limited unwinding in Class 242, subclass 84.1 L.

OBJECTS

Amongst fishermen it is well-known that fish feed in various depths, and to catch them, one should place the bait at the depth of feeding. When a fish is caught, the fisherman usually tries to return the bait to the same depth, but this is very hard to judge accurately. The object of this invention is to provide a reel by means of which a line can be let off freely and the bait fished at various depths until a fish bites, whereupon the one-way break is set to prevent further unreeling of the line. The line, hopefully with a hooked fish on it, may then be wound in normally, but when it is again let off the line will be stopped when the bait reaches the same depth where the caught fish bit. Alternatively, if the fisherman desires to fish with the bait at a predetermined distance above the bottom, he may disable the break so as to let off the line until the sinker reaches the bottom, then wind in the line a certain number of turns (one turn may equal one foot) until the bait is lifted to a desired height above the bottom, and then the break is pre-set so that it will stop further unreeling of the line; and then when the line is reeled in and subsequently let off, the bait will be disposed at the same distance above the bottom as before.

These and other objects will be apparent from the following specification and drawings in which.

Figure 1:
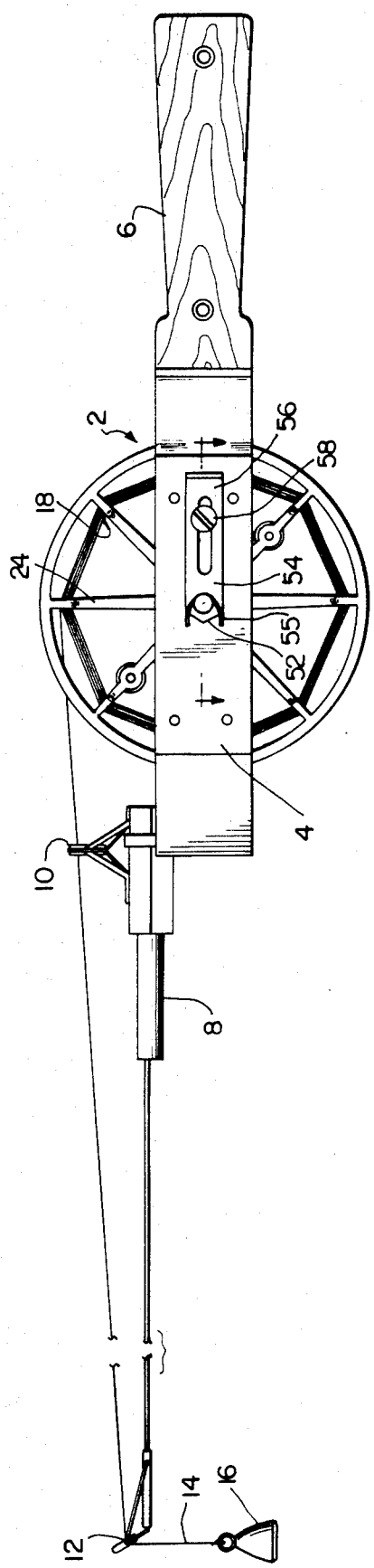
FIG. 1 is a side-elevation of the reel mounted on a rod designed to accommodate it and showing the break in pre-set condition.
Figure 2:
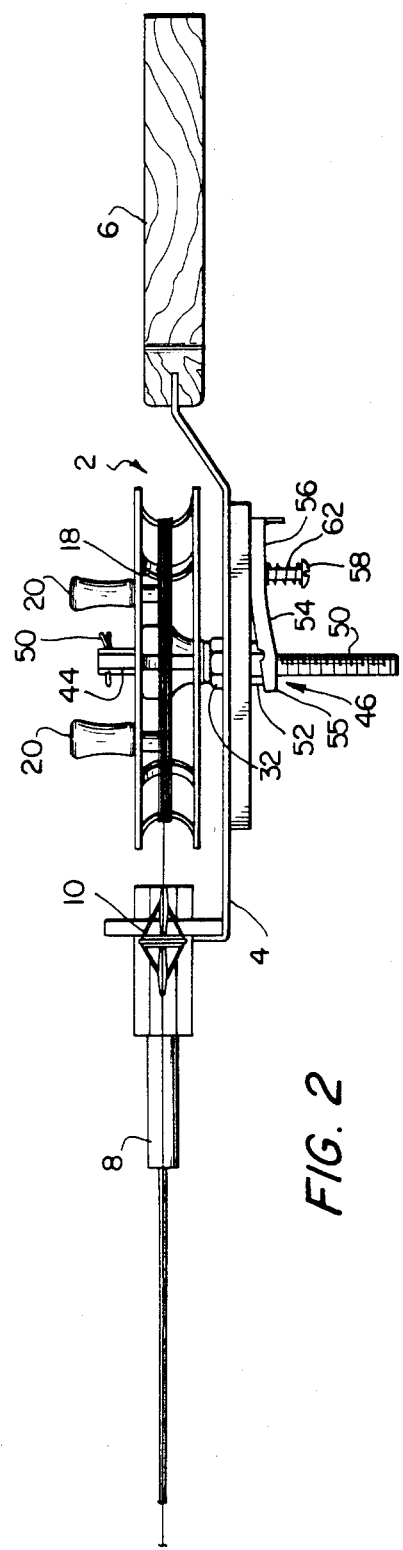
FIG. 2 is a plan view of the rod and reel with the break pre-set as in FIG. 1.

Referring now to the drawings, in which like reference numerals denote similar elements, the reel 2 is mounted on a off-set 4 of the handle 6 of a stub rod 8 which has a customary line guide eye 10 and tip 12 through which a fishing line 14 runs. The free end of the line generally terminates at or near a sinker 16, it being understood that one or more hooks or lures, not shown, are attached to the line either above or below the sinker. The inboard end of the line winds onto a spool 18 having the usual handles 20, the reel being supported on a hub 22 by spokes 24. Hub 22 is rotatably mounted on a sleeve 24 whose inner end 26 is externally threaded as at 28 by threads (not detailed) into a threaded aperture 30 in off-set 4. The sleeve 24 is further secured by a lock nut 32 which jams against off-set 4. A thrust bearing ring 34 is engaged between the inner end of hub 22 and the hub is blocked against removal off the outer end of sleeve 26 by a snap ring 36 which engages into an annular indentation (not shown) adjacent the outer end of the sleeve and which abuts against the inner wall of a countersink 38 in the outer end of the hub.

A washer 40 is press-fitted into countersink 38, the inner periphery of the washer being provided with flats 42 which engage flats 44 on a shaft 46 which slides lengthwise through sleeve 26, the net result being that although the shaft 46 can slide lengthwise through the sleeve, because of the non-rotative connection between washer 40 and the flatted portion 44 of the shaft, the shaft turns with the reel spool 18.

The free end of the flatted end portion 44 of shaft 46 has through it a cotter pin abutment 50 which is engageable against washer 40 under conditions described hereinafter. The other end portion of shaft 46 has threads 50 threadedly engaged through a nut 52. On the outer side of off-set 4 is mounted a sliding wrench 54 engageable with and disengageable from nut 52 either to hold the nut against rotation or to let it rotate freely. The sliding wrench 54 has a nut-engaging portion 55 and a shank 56 with a slot 57 through which extends a screw 58 whose inner end is screwed into the off-set 4 as indicated at 60. The compression spring 62 between the head of screw 58 and the outer side of off-set 4 holds the sliding wrench in either nut engaging or disengaging conditions as desired.

Figure 3:
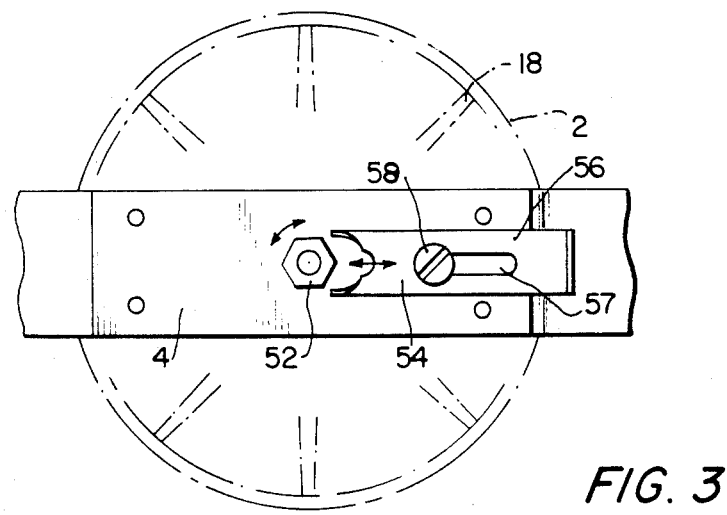
FIG. 3 is a fragmentary side-elevation of the reel showing the break disabled.
Figure 4:
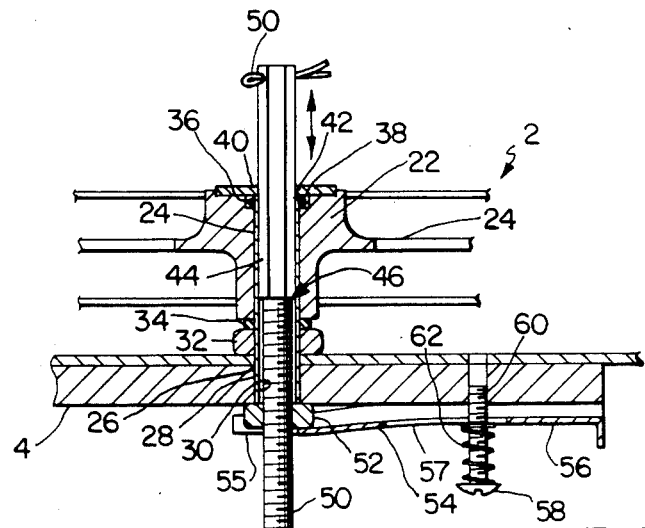
FIG. 4 is a fragmentary cross-section through the reel showing the break pre-set to stop further let off of the line after a predetermined number of turns of the reel; and, FIG. 5 is a view similar to FIG. 4 showing the break engaged after the predetermined number of turns of the reel.
Figure 5:
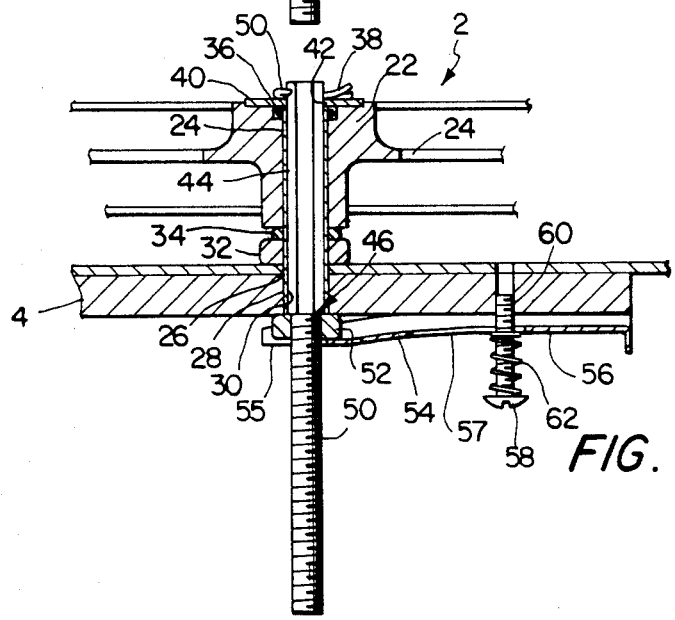

In operation, let it be assumed that the parts are first in the condition illustrated in FIG. 3 wherein cotter pin 48 engages against washer 40 (as in FIG. 5) and the reel is turned a predetermined number of revolutions, like 15 turns, to let off the line a predetermined distance, for example, 15 feet. Then sliding wrench 54 is slid forwardly to engage nut 52 and prevent the latter from turning; and any further unwinding rotation of the reel causes cotter pin 48 to jam in against washer 40 so as to prevent any further unwinding of the reel. When the fisherman winds in the line, the spline connection between the flats on washer 40 and the flatted portion 48 of shaft 46 screws the threaded portion 50 of shaft 46 through nut 52, thereby extending the cotter pin end of shaft 46 outwardly as shown in FIG. 4. When the reel is next turned so as to let out the line, the threaded end 50 of shaft 46 screws inwardly through nut 52, thereby drawing the cotter pin in against washer 40 so as to brake the reel against further unwinding at its fifteenth unwinding turn. In net result, the offset 4, lock nut 32, thrust bearing 34, hub 22 and washer 40 are squeezed together between nut 52 and cotter pin 48 when the cotter pin 48 engages against washer 40. As previously described, various other modes of operation may be practiced.

I claim:

1. A fishing rod and reel comprising,
   a rod having a handle,
   a spool having a hub with an axial bore therethrough,
   a hollow sleeve having one end thereof mounted on one side of the rod handle, said sleeve extending through the hub bore and rotatably supporting the hub thereon,
   a shaft lengthwise slideable through the hollow sleeve,
   spline means on one end portion of the shaft for non-rotatably connecting the hub and said shaft whereby the shaft and the hub rotate together and the shaft slides lengthwise through the sleeve,
   threads on the opposite end portion of the shaft,
   nut means threadedly engaged on said threads for driving said shaft lengthwise in one direction or the other through the hollow sleeve in response to rotation of the shaft relative to the nut in one rotative direction or the other, wrench means movably mounted on said rod handle for selective engagement and disengagement with the nut means, and breaking means on said one end portion of the shaft for breakingly engaging the hub in response to lengthwise movement of the shaft in a direction to move the breaking means towards the hub.

2. A fishing rod and reel as claimed in claim 1, said one end of the hollow sleeve being mounted in an aperture through the rod handle, said nut means and wrench means being disposed on the other side of the rod handle.

3. A fishing rod and reel as claimed in claim 2, said wrench means including a nut-engaging portion and a shank portion, said shank portion being slideably mounted on said other side of the rod handle.

4. A fishing rod and reel as claimed in claim 1, said breaking means including an abutment adjacent the free end of the spline portion of said shaft and said hub having a washer affixed thereto for engagement by the abutment.

* * * * *